Figure 1:
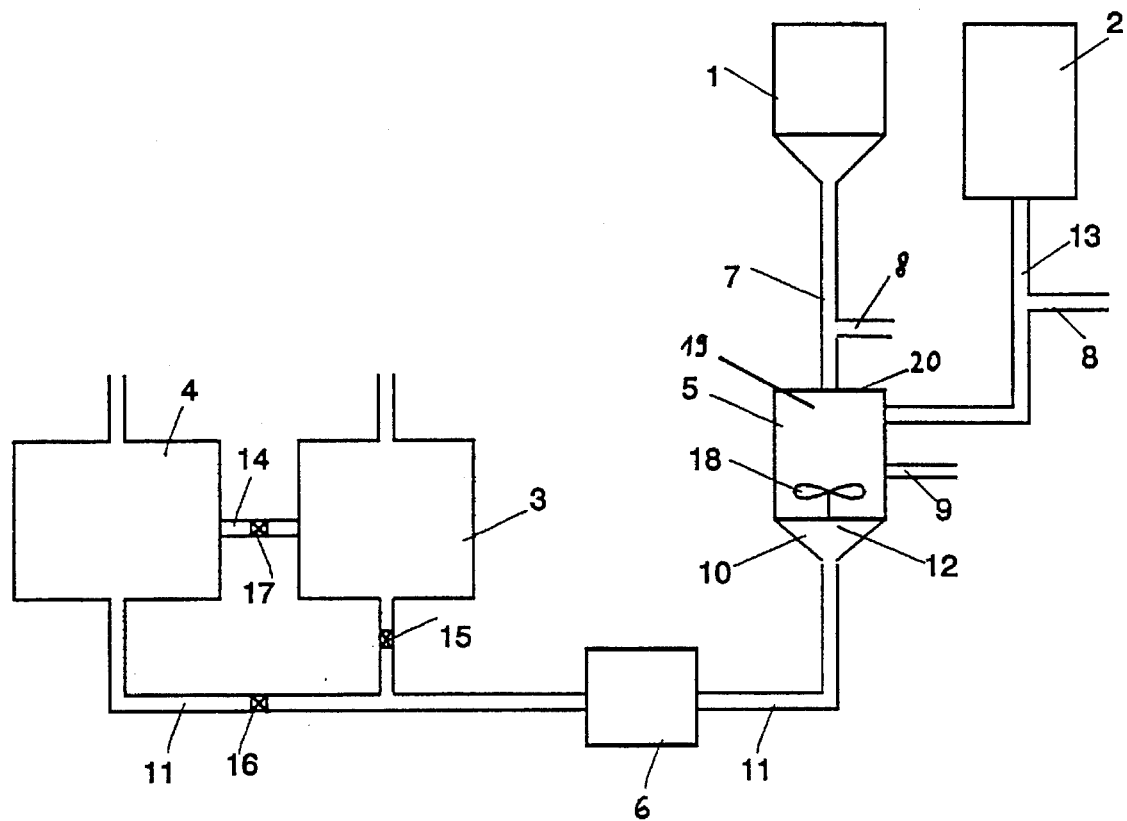

United States Patent [19]

Wirth

[11] Patent Number: 5,481,961
[45] Date of Patent: Jan. 9, 1996

[54] INSTALLATION FOR PRODUCING WORT

[75] Inventor: Karl-Dieter A. Wirth, Ichenhausen, Germany

[73] Assignee: Anton Steinecker Entwicklungs GmbH & Co., Freising/Attaching, Germany

[21] Appl. No.: 186,790

[22] Filed: Jan. 25, 1994

[30] Foreign Application Priority Data

Feb. 1, 1993 [DE] Germany .......................... 43 02 729.6

[51] Int. Cl.⁶ .................................................. C12C 7/14
[52] U.S. Cl. ................................................ 99/177.2; 99/278
[58] Field of Search ................... 99/277, 276, 277.1, 99/277.2, 278; 426/11, 16, 18, 28, 29

[56] References Cited

U.S. PATENT DOCUMENTS 2,948,617  8/1960  Paine ............................................ 99/278
3,057,726  10/1962  Shore ........................................... 99/278
3,535,116  10/1970  Harsanyi ..................................... 99/278
3,834,296  9/1974  Kehse ......................................... 99/277.2

Primary Examiner—Robert W. Jenkins
Attorney, Agent, or Firm—Tilton, Fallon, Lungmus & Chestnut

[57] ABSTRACT

An installation for producing wort by means of a cereal cooker and by means of a mash tun, wherein the cereal cooker is connected to a malt adjunct bin via an adjunct prewasher and to a grist bin, and wherein the mash tun is connected to the grist bin via a mash bin connected to a water supply and via a pump. A combination bin is provided to reduce the headroom of such an installation and to save construction expenses, which is formed as an adjunct prewasher and a mash tun.

9 Claims, 1 Drawing Sheet

INSTALLATION FOR PRODUCING WORT

The present invention relates to an installation for producing wort by means of a cereal cooker and by means of a mash tun, wherein the cereal cooker is connected to a malt adjunct bin via an adjunct prewasher and to a grist bin, and wherein the mash tun is connected to the grist bin via a mash bin connected to a water supply and via a pump.

Such a known installation is used for brewing e.g. export beers, wherein the malting losses occuring during the malting process are avoided in that starch-containing malt adjuncts are used for brewing at a predetermined proportion. The malt adjunct bin and the adjunct prewasher are diposed in this installation above the cereal cooker in a line. Thereby, the adjunct is advanced into the cereal cooker due to reasons of gravity. It is a disadvantage that this installation has a great headroom which requires a large space and increases the manufacturing costs and the construction expenses.

It is the object of the invention to further improve the aforementioned installation so that the headroom is reduced and the construction expenses are lowered.

This object is attained according to the invention by a combination bin, which is formed as an adjunct prewasher and a mash bin. Thus, the known separate adjunct prewasher becomes superfluous in the invention, since now the combination bin serves as the adjunct prewasher as well as the mash bin and may be installed in a milling plant. This combination bin is usually disposed within the installation at the same position as the mash bin of the prior art. The headroom of the installation according to the invention is thus reduced by the length of the separate ajunct prewasher. Moreover, the construction expenses of the installation are lowered, since one single combination bin is sufficient instead of the known separate adjunct prewasher and the known separate mash bin. Despite the lower position of the adjunct prewasher, the adjunct can further be conveyed to the cereal cooker, since the pump for feeding the mash into the mash tun also conveys the adjunct and the grist into the cereal cooker.

In order to prevent impurities from entering into the cereal cooker, an especially preferred embodiment provides that the combination bin comprises a sieve at the outlet and/or at the overflow.

For a better mixing of the adjunct during the washing process, a further embodiment of the invention provides that the combination bin is connected to a pressure air line.

A further development of the invention provides that a mixing device is disposed in the combination bin. By means of this mixing device, the mash filled into the combination bin, which might as well be a mash tun, can be mixed well.

In order to obtain clear and dry bears, the malt adjunct is preferrably rice. Other adjuncts are also possible, such as corn, unmalted barley or wheat.

The invention will now be described with reference to the drawing:

FIG. 1 shows an embodiment of the invention.

The installation according to the invention consists of a malt adjunct bin 1, a grist bin 2, a cereal cooker 4, a mash tun 3, a combination bin 5 and a pump 6. The combination bin 5 is formed as an adjunct prewasher as well as a mash bin. During operation of the installation, the adjunct gets from the malt adjunct bin 1 via the connection line 7 into the combination bin 5, which is connected to a water supply 8. In the combination vessel 5 formed as an adjunct prewasher, the adjunct is washed by washing means shown as water supply 8 which supplies water to the adjunct. For better mixing the adjunct, pressurized air is supplied via a pressure air line 9 which is connected to the combination bin 5 and is part of the washing means. After the washing process, the adjunct is conveyed to a pump line 11 via an outlet 10 of the combination bin 5, said pump line being connected to a pump 6, and is coneyed into the cereal cooker 4 by means of the pump 6. The outlet 10 and the overflow 19 each comprise a sieve 12, 20 which retain impurities of the adjunct. Some grist is added to the washed adjunct in the cereal cooker 4. For this purpose the grist is conveyed from the grist bin 2 via a connection line 13 into the combination bin 5 and is then conveyed into the cereal cooker via the connection line 11 by means of the pump 6. Additionally, water may be supplied via the water supply 8.

The grist gets from the gist bin 2 via the connection line 13 into the combination bin 5, which may also be a mash tun. On the way from the grist bin to the combination bin, water is added, which is supplied to the combination bin 5 via the water supply 8, and is mixed or mashed by mashing means which may take the form of a mixing device 18 disposed within the combination bin. After the mashing process, the mash is supplied to the mash tun 3 via the pump line 11 by means of the pump 6. The content of the cereal cooker 4 is supplied to this mash tun 3 via a connection line 14, which connects the cereal cooker 4 to the mash tun 3. The mixture from the content of the cereal cooker 4 and the mash, which is the wort, is then heated in the mash tun 3 for further processing.

In order to selectively connect the pump line 11 to the mash tun 3 or the cereal cooker 4, controllable valves are provided in the pump line for the flow connection of the pump line 11 to the mash tun 3 or the cereal cooker 4, respectively. The connection line 14 also comprises a controllable valve 17.

A flat headroom of the installation is achieved by combining the adjunct prewasher and the mash bin in a combination bin 5, disposed on the same level as the cereal cooker 4 and the mash tun 3. Moreover, the manufacturing costs of the installation are lowered, since a combination bin is provided instead of a separate adjunct prewasher and a separate mash tun.

I claim:

1. An installation for producing wort comprising;
   a malt adjunct bin (1) and a grist bin (2) connected to a combination bin (5) respectively by a first pipeline (7) and a second pipeline (13);
   a cereal cooker (4) and a mash tun (3) connected to said combination bin (5) by a third pipeline (11);
   said combination bin including washing means for prewashing malt adjunct received from said malt adjunct bin (1) and including mashing means for mashing grist received from said grist bin (2).

2. The installation of claim 1 in which said third pipeline (7) includes a pump (6).

3. The installation of claim 1 in which said third pipeline includes controllable valve means for directing a flow in said third pipeline (11) to either said cereal cooker (4) or said mash tun (3).

4. The installation of claim 1 in which said washing means includes a water supply (8) which supplies water to said combination bin (5).

5. The installation of claim 1 in which said washing means includes an air pressure line (9) for supplying pressurized air to said combination bin (5).

6. The installation of claim 1 in which said mashing means includes a mixing device (18) for mashing grist in said combination bin (5).

7. The installation of claim 1 in which a sieve (12) is provided between said combination bin (5) and said third pipeline (11).

8. The installation of claim 1 in which a sieve (20) is provided between said first pipeline (7) and said combination bin (5).

9. The installation of claim 1 in which said malt adjunct bin (1) includes a quantity of malt adjunct, said malt adjunct being rice.

\* \* \* \* \*